United States Patent
Singh et al.

(10) Patent No.: US 10,127,458 B2
(45) Date of Patent: Nov. 13, 2018

(54) METHOD AND SYSTEM FOR CATEGORIZATION OF A SCENE

(71) Applicant: Viscando AB, Göteborg (SE)

(72) Inventors: Amritpal Singh, Torslanda (SE); Ulf Erlandsson, Onsala (SE)

(73) Assignee: VISCANDO AB, Göteborg (SE)

( * ) Notice: Subject to any disclaimer, the term of this patent is extended or adjusted under 35 U.S.C. 154(b) by 28 days.

(21) Appl. No.: 15/538,498

(22) PCT Filed: Dec. 21, 2015

(86) PCT No.: PCT/SE2015/051382
§ 371 (c)(1),
(2) Date: Jun. 21, 2017

(87) PCT Pub. No.: WO2016/111640
PCT Pub. Date: Jul. 14, 2016

(65) Prior Publication Data
US 2017/0344835 A1    Nov. 30, 2017

(30) Foreign Application Priority Data
Jan. 7, 2015   (SE) ...................................... 1550006

(51) Int. Cl.
G06K 9/00 (2006.01)
G06K 9/62 (2006.01)

(52) U.S. Cl.
CPC ..... G06K 9/00785 (2013.01); G06K 9/00771 (2013.01); G06K 9/6293 (2013.01); G06K 2209/23 (2013.01)

(58) Field of Classification Search
CPC .......... G06K 9/00771; G06K 9/00785; G06K 9/00791; G06K 9/00805; G06K 9/6292;
(Continued)

(56) References Cited

U.S. PATENT DOCUMENTS

| 5,724,447 A | 3/1998 | Fukushima | 382/211 |
| 6,570,608 B1 | 5/2003 | Tserng | 348/143 |

(Continued)

FOREIGN PATENT DOCUMENTS

| CN | 101388145 A | 3/2009 | G08G 1/01 |
| CN | 103324955 A | 9/2013 | G06K 9/66 |

(Continued)

OTHER PUBLICATIONS

Rota, S. et al., "A framework for object detection, tracking and classification in urban traffic scenarios using stereovision," IEEE 5th International Conference onIntelligent Computer Communication and Processing, 2009, ICCP 2009. IEEE, Piscataway, NJ, USA dated Aug. 27, 2009, pp. 153-156, 4 pages.

(Continued)

*Primary Examiner* — Andrew W Johns
(74) *Attorney, Agent, or Firm* — RMCK Law Group PLC (57) ABSTRACT

The present invention relates to a method for categorizing a moving object within a scene In particular, the present invention relates to a method specifically taking into account the three dimensional data within a scene for determining the location of and type of objects present within the scene. The method involves determining a first probability level for the type of object based on its size and shape, determining a second probability level for the type of object based on its relative speed, and defining the type of the object based on a combination of the first and the second probability level. The invention also relates to a corresponding system and a computer program product.

15 Claims, 4 Drawing Sheets

(58) Field of Classification Search
CPC .... G06K 9/6293; G06K 2209/23; G06T 7/20;
G06T 7/285; G06T 7/50; G06T 7/55;
G06T 7/593; G06T 7/60; G06T 7/62;
G06T 2207/30236; G06T 2207/30261
See application file for complete search history.

(56) References Cited

U.S. PATENT DOCUMENTS

| | | | |
|---|---|---|---|
| 7,602,944 B2 | 10/2009 | Campbell et al. | 382/103 |
| 2005/0105765 A1 | 5/2005 | Han et al. | 382/100 |
| 2005/0201612 A1 | 9/2005 | Park et al. | 382/154 |
| 2006/0227862 A1 | 10/2006 | Campbell et al. | 375/240 |
| 2007/0122040 A1 | 5/2007 | Au et al. | 382/224 |
| 2007/0237398 A1 | 10/2007 | Chang et al. | 382/224 |
| 2009/0010490 A1 | 1/2009 | Wang et al. | 382/103 |
| 2009/0195371 A1 | 8/2009 | Camus | 340/435 |
| 2010/0092078 A1 | 4/2010 | Sagawa | 382/164 |
| 2010/0194883 A1 | 8/2010 | Busch | 348/143 |
| 2012/0087572 A1 | 4/2012 | Dedeoglu et al. | 382/154 |
| 2012/0115598 A1 | 5/2012 | Hagström et al. | 463/31 |
| 2012/0140061 A1 | 6/2012 | Zeng | 348/135 |
| 2013/0182114 A1 | 7/2013 | Zhang et al. | H04N 7/18 |
| 2014/0339374 A1 | 11/2014 | Mian et al. | G08G 1/0175 |
| 2015/0210280 A1* | 7/2015 | Agnew et al. | B60W 30/09 701/48 |
| 2017/0132934 A1* | 5/2017 | Kentley et al. | G08G 1/202 |
| 2017/0330454 A1* | 11/2017 | Bäckvall et al. | G08G 1/04 |

FOREIGN PATENT DOCUMENTS

| | | | |
|---|---|---|---|
| EP | 0955606 A2 | 11/1999 | G06T 7/00 |
| JP | 2005215909 A | 8/2005 | G08G 1/056 |
| WO | 2006082429 A1 | 8/2006 | G06T 7/20 |
| WO | 2010124062 A1 | 10/2010 | G06K 9/00 |
| WO | 2012029058 A1 | 3/2012 | G06T 7/00 |
| WO | 2013029674 A1 | 3/2013 | G06K 9/46 |

OTHER PUBLICATIONS

European Search Report for EP Application No. 15877226.9 dated Jul. 18, 2018, 7 pages.

International Search Report and Written Opinion for International Application No. PCT/SE2015/051382 dated Feb. 25, 2016, 16 pages.

* cited by examiner

METHOD AND SYSTEM FOR CATEGORIZATION OF A SCENE

CROSS-REFERENCE TO RELATED APPLICATIONS

This application is a 371 U.S. National Stage of International Application No. PCT/SE2015/051382, filed Dec. 21, 2015, which claims priority to Swedish Application No. 1550006-9, filed on Jan. 7, 2015. The disclosures of each of the above applications are incorporated herein by reference in their entirety.

TECHNICAL FIELD

The present invention relates to a method for categorizing a moving object within a scene. In particular, the present invention relates to a method specifically taking into account the three dimensional data within a scene for determining the location of and type of objects present within the scene. The invention also relates to a corresponding system and a computer program product.

BACKGROUND OF THE INVENTION

Camera systems are normally used within the security business for surveying a scene. The low cost of the cameras used and the simplicity involved for communicating with the cameras, typically over the Internet, provides for further possible applications such for example for use within a shop for determining a customer shopping behavior.

However, the collection of video data may unfortunately in some instances potentially compromise the privacy of anyone observed by the system. There is thus a trade-off between the advantages made possible with video analysis and the thereto related privacy issues. This is specifically apparent within an everyday situation where a person is typically not conscious of the fact that video capture is taking place, such as within the above mentioned shop, within a park, etc.

A solution to this problem is provided in U.S. Pat. No. 7,602,944, disclosing a computer-implemented method of identifying a moving object in a digital video stream of a scene. The identification of the moving object is achieved by threshold subtracting a current video frame from a short term average video frame. The video frame is typically of an in comparison low resolution, i.e. reduced resolution, whereby generally all details will be discarded and the privacy for e.g. the person(s) captured by the video camera is upheld. The objects detected within the scene may be "followed" through a plurality of subsequent video frames, allowing the direction of the object to be determined as well as for determining the number of objects passing into and out from a defined zone within the scene.

Even though the disclosure of U.S. Pat. No. 7,602,944 provides some relief to the privacy issues discussed above, there will be problems as the robustness of the system, specifically in relation to scenes with varying illumination, such as for example in an outdoor scenario. Accordingly, there is a need for a more robust method for object detection within a scene, preferably also allowing for the possibility of extracting further information relating to the detected objects while still keeping the privacy at an in comparison high level.

Further attention is drawn to US20130182114. US20130182114 makes use of a video camera and a depth sensor for determining a real life height and width of an object. In an organized environment, such as within a retail space, the method disclosed in US20130182114 may be used for object separation and subsequent tracking of the objects.

In addition, CN101388145 provides an automatic warning method for improving road safety. The disclosed method uses single camera "two-dimensional" object motion detection, including determination of a size and a speed of the object.

SUMMARY OF THE INVENTION

According to an aspect of the invention, the above is at least partly met by a computer-implemented method for classifying a type of a moving object within a scene, the moving object being one of a plurality of different types of predetermined objects, the method comprising receiving an image stream comprising a plurality of images, each of the plurality of images being a captured representation of the scene and comprising depth information as to content within the scene, wherein the content of the scene comprises at least one physical foreground object and a physical background, processing the plurality of images to produce an equal plurality of depth maps of the scene, forming height maps for each of the plurality of images based on a predetermined model of the background and the corresponding depth map, extracting the at least one physical foreground object from each of the plurality of images based on the corresponding height map, determining, for each of the plurality of images, a relative position of the at least one physical foreground object within the scene based on the height maps, determining a first probability level for the type of object within each of the images by matching the extracted physical foreground object with a predetermined set of different object types, wherein each of the predetermined set of different object types are defined to have at least a length, a height and a width being within a predetermined range, determining a second probability level for the type of the object by determining a difference in the relative position for the object in at least two images of the plurality of images, converting the difference in relative position to a relative speed for the object, and matching the relative speed with speed profiles for the predetermined set of different object types, and defining the type of the foreground object based on a combination of the first and the second probability level.

The general concept of the present invention is based on the fact that it may be possible to improve the classification of objects within a scene by determination of different information about the extracted object, and combine these pieces of information (e.g. a first and a second piece of information about the object as indicated above) based on a probability level for each of the pieces of information. This will advantageously reduce any short term "noise" aspects that may result in error e.g. one of the pieces of information. However, when seen over time and when taking into account the reliability for each of the pieces of information a robust object classification may be achieved.

This is specifically useful when performing object classification in a "mixed object" scene, e.g. where both a pedestrian and a vehicle are present. This will of course be further advantageous in scenes comprises a plurality of pedestrians and vehicles of different forms and shapes, e.g. including cars, trucks and bikes/bicycles. As a comparison, the above cited US20130182114 is specifically targeting a pre-calibrated environment, i.e. being a typically no-mixed environment where only a single type of object is to be detected and subsequently tracked.

It may also be possible to further improve the determination of the type of object by including at least a third probability for the type of the object, wherein the third probability is determined by matching the extracted foreground object with a set of predefined images for the plurality of different types of objects, and determining a probability level, being a representation for the third probability, based on a resulting matching level.

It is advantageous, and within the scope of the invention, to store, for each of the plurality of images, data representing the type of the extracted object(s) and its relative position. Once the data is stored, e.g. within a database, it may for example be possible to track the objects within subsequent images of the image stream. It may also be possible to determine movement pattern for the different types of objects within the scene.

In the most general implementation of the invention, image data is received and processed. However, it may be possible to further control at least two cameras for acquiring the image stream, wherein each of the at least to cameras are arranged to capturing a predetermined spatially separated corresponding image of the scene. Each image pair will then need to be processed for determining the depth information based on the corresponding images captured by the at least two cameras, for example using a known stereo/3D processing algorithm.

In some implementations of the invention it may be advantageous to determine the absolute location of the object(s) within the scene. This may for example be achieve by means of an absolute location determined within the scene, where the relative locations for the objects based may be transformed to absolute positions based on the absolute position within the scene. In a possible embodiment, the absolute position within the scene may be acquired from a GPS receiver arranged within the scene.

According to another aspect of the invention there is provided an image processing system for classifying a type of a moving object within a scene, the moving object being one of a plurality of different types of predetermined objects, the image processing system comprising a control unit configured to receiving an image stream comprising a plurality of images, each of the plurality of images being a captured representation of the scene and comprising depth information as to content within the scene, wherein the content of the scene comprises at least one physical foreground object and a physical background, processing the plurality of images to produce an equal plurality of depth maps of the scene, forming height maps for each of the plurality of images based on a predetermined model of the background and the corresponding depth map, extracting the at least one physical foreground object from each of the plurality of images based on the corresponding height map, determining, for each of the plurality of images, a relative position of the at least one physical foreground object within the scene based on the height maps, determining a first probability level for the type of object within each of the images by matching the extracted physical foreground object with a predetermined set of different object types, wherein each of the predetermined set of different object types are defined to have at least a length, a height and a width being within a predetermined range, determining a second probability level for the type of the object by determining a difference in the relative position for the object in at least two images of the plurality of images, converting the difference in relative position to a relative speed for the object, and matching the relative speed with speed profiles for the predetermined set of different object types, and defining the type of the foreground object based on a combination of the first and the second probability level. This aspect of the invention provides similar advantages as discussed above in relation to the previous aspects of the invention.

In a preferred embodiment, the system further comprises at least two cameras wherein each of the at least to cameras are arranged to capturing a predetermined spatially separated corresponding image of the scene. In such an embodiment, the control unit thus further configured to control at least two cameras for acquiring the image stream, and to determine the depth information based on the corresponding images captured by the at least two cameras.

Within the context of the invention it may alternatively be possible to include a time-of-flight (ToF) camera for acquiring the depth information as to the objects within the scene. In a possible implementation of the invention, a combination of "normal" 2D cameras are used together with at least one ToF camera According to a still further aspect of the invention there is provided a computer program product comprising a computer readable medium having stored thereon computer program means for operating an image processing system comprising a control unit, the image processing system configured for classifying a type of a moving object within a scene, the moving object being one of a plurality of different types of predetermined objects, the computer program product comprising code for receiving an image stream comprising a plurality of images, each of the plurality of images being a captured representation of the scene and comprising depth information as to content within the scene, wherein the content of the scene comprises at least one physical foreground object and a physical background, code for processing the plurality of images to produce an equal plurality of depth maps of the scene, code for forming height maps for each of the plurality of images based on a predetermined model of the background and the corresponding depth map, code for extracting the at least one physical foreground object from each of the plurality of images based on the corresponding height map, code for determining, for each of the plurality of images, a relative position of the at least one physical foreground object within the scene based on the height maps, code for determining a first probability level for the type of object within each of the images by matching the extracted physical foreground object with a predetermined set of different object types, wherein each of the predetermined set of different object types are defined to have at least a length, a height and a width being within a predetermined range, code for determining a second probability level for the type of the object by determining a difference in the relative position for the object in at least two images of the plurality of images, converting the difference in relative position to a relative speed for the object, and matching the relative speed with speed profiles for the predetermined set of different object types, and code for defining the type of the foreground object based on a combination of the first and the second probability level. Also this aspect of the invention provides similar advantages as discussed above in relation to the previous aspects of the invention.

The control unit preferably including a microprocessor or any other type of computing device. Similarly, a software executed by the control unit for operating the inventive wireless communication device may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the wireless communication device may be at least partly automated, implemented as e.g. software, hardware and a combination thereof.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1:
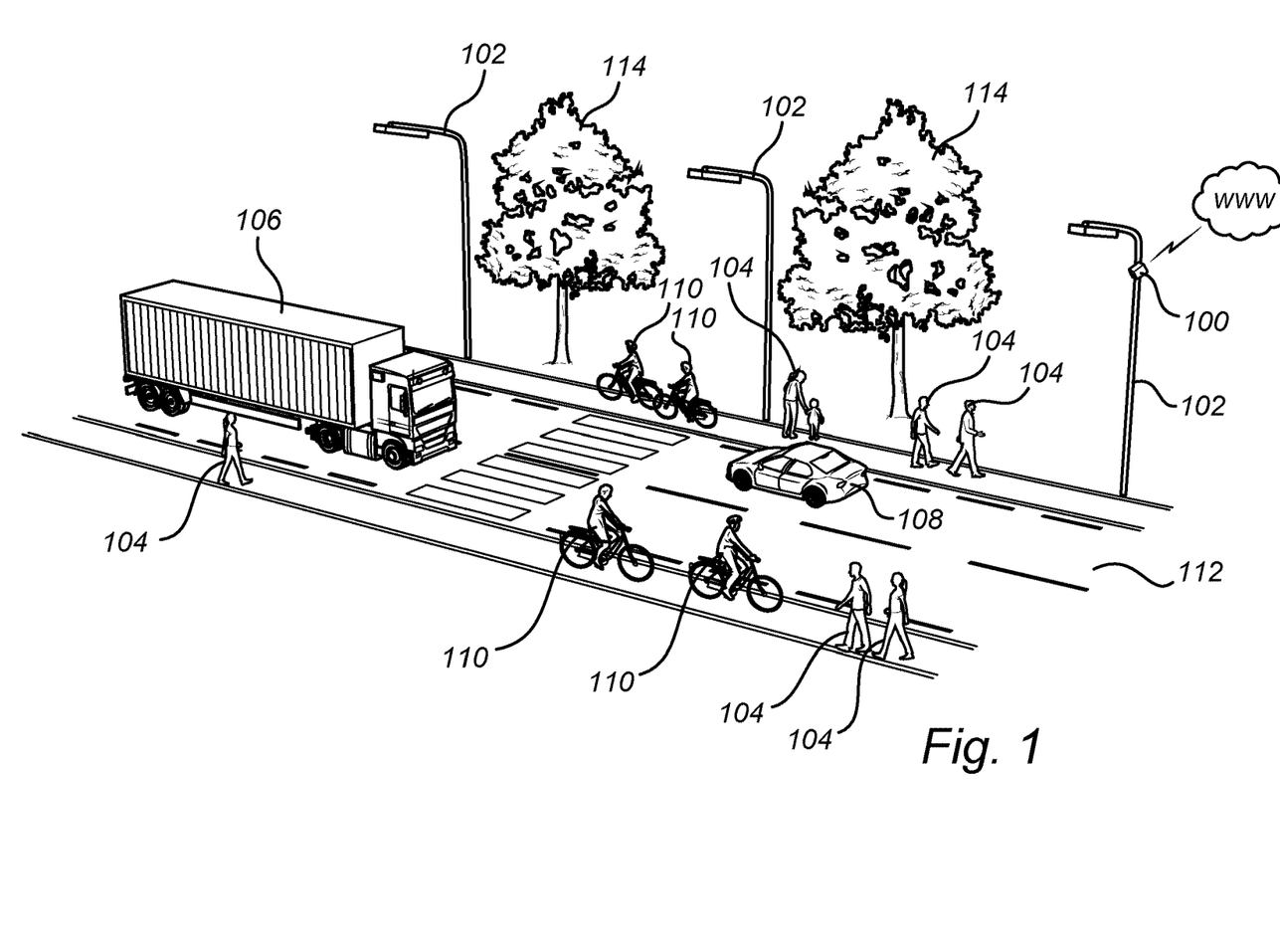
FIG. 1 illustrates an image processing system according to the invention arranged for collecting and processing image data of a scene.

Referring now to the drawings and FIG. 1 in particular, there is depicted an image processing system 100 arranged in an elevated position as to a ground/street level, in the illustrated embodiment affixed to an elongated light post 102. The elevated position of the image processing system 100 provides for the possibility of monitoring a scene comprising a plurality of different physical objects. Specifically, in the disclosed embodiment the scene comprises a plurality of different types of physical foreground objects including pedestrians 104, different types of vehicles, such as a truck 106 and a car 108, as well as a plurality of bicycles 110. The scene also comprises a background, for example including a street 112, trees 114, etc. It should be noted that the image processing system 100 may be affixed to or integrated into any form of elevated structure. As such, it could be possible to arrange the image processing system 100 onto e.g. a bridge, an overpass, etc. The image processing system 100 could possibly be integrated with a sign post or any other form of arrangement. The image processing system 100 could be stationary of mobile, connected to the main grid or battery powered.

The truck 106 and the car 108 travel along the street 112, in opposite directions in different lanes, whereas the pedestrians 104 and the bicycles 110 shares the pavement space at the outsides of the street traveling at mixed directions at each of the pavements.

In the illustrated embodiment, the image processing system 100 collects image data for a preselected portion of the scene. The size of the preselected portion of the scene may be dependent on the capacity of the image processing system 100, the resolution of the cameras, etc. The collection of image data and possible image processing performed by the image processing system 100 may as exemplified in FIG. 1 be communicated, e.g. wirelessly or wired, to a remote server (not shown), for example over the Internet. Any type of wired or wireless communication protocol could be possible in accordance to the invention.

Figure 2:
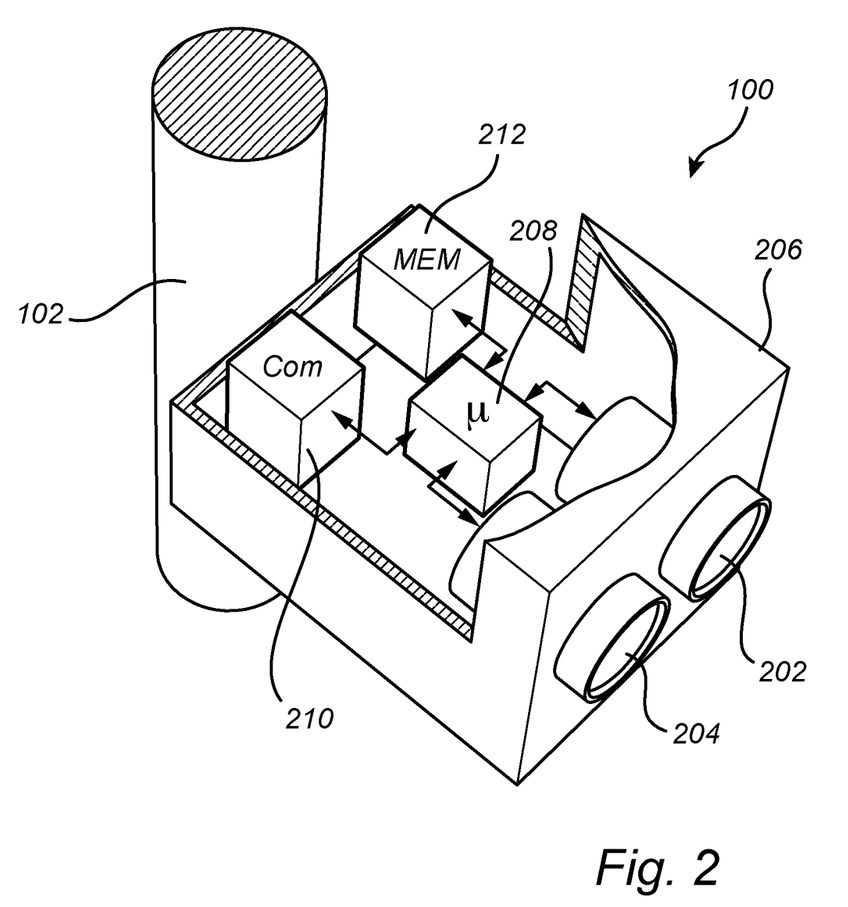
FIG. 2 provides a conceptual illustration of the image processing system illustrated in FIG. 1.

Turning now to FIG. 2, which conceptually illustrates the image processing system 100 as shown in FIG. 1. The image processing system 100 comprises a first (left) 202 and a second (right) camera 204 having optical lenses connected thereto, respectively. The image processing system 100 comprises a casing 206, preferably configured for handling outdoor use, the casing holding the cameras 202, 204 as well as processing and communication functionality for the image processing system 100. Typically, the image processing system 100 comprises a control unit 208 arranged in communication with the cameras 202, 204 as well as a communication module 210 (for allowing communication with e.g. the above mentioned remote server) and a memory element 212 (e.g. for intermediate storage of image data). It should be understood that the cameras 202, 204 may not necessarily be provided as separate elements, but may be integrated as one single unit provided with a first and a second set of optical lenses arranged to a first and a second image sensor (i.e. provided for the cameras 202, 204 respectively).

As understood from the above, the image processing system 100 is configured for stereo collection of image data using the first and the second camera 202, 204. To improve the possibility of creating useful three dimensional image data it is desirable to separate the first and the second camera 202, 204 with a predetermined distance, the distance being dependent on the desired implementation. Furthermore, within the scope of the invention, it should be understood that it could be possible to use other forms of cameras for image collection, such as using a time-of-flight (ToF) camera. Also, the general concept of the invention may be implemented based on image data captured using "external" cameras (i.e. not necessarily including the cameras themselves). That is, the invention may for example be implemented as a server solution where the server receives image data from e.g. remotely arranged cameras. As such, at least some of the processing performed could be implemented in a distributed manner, e.g. partly as a "cloud" solution.

Figure 3:
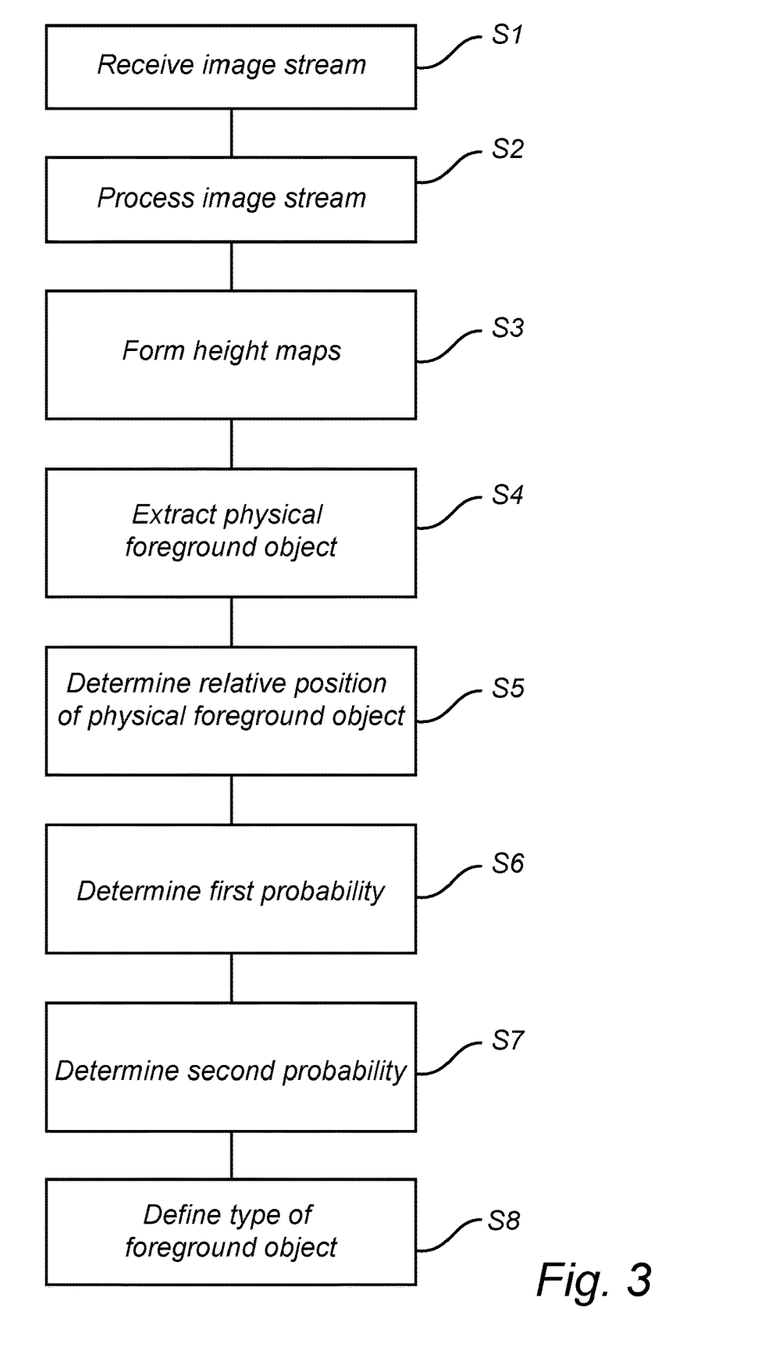
FIG. 3 is a flow chart illustrating the exemplary steps for operating the system according to the invention.

During operation of the image processing system 100, with further reference to FIG. 3, the process starts by the control unit 208 receiving, S1, an image stream from the first and the second camera 202, 204. The control unit 208 subsequently process, S2, the image stream for forming a three dimensional representation of the scene monitored by the cameras 202, 204. The three dimensional representation is typically formed based on depth information extracted based on the predetermined separation of the first 202 and the second 204 camera, thereby forming depth maps for each image of the image stream (i.e. pair of images from the cameras 202, 204).

Based on the depth map and a predetermined model of the background it is possible to form, S3, height maps for each of the image pair. The background model could for example be an "empty" scene where no foreground objects are present. The background model could also be determined in other manners as would be readily understood by the skilled addressee.

The height maps are subsequently used for extracting a physical foreground object from the scene, such as a pedestrian 104, a car 106 or a bicycle 110. The extracted foreground objects are typically defined to have a "boundary box" closely surrounding the object. The boundary box may typically be rectangular but may also be defined in a more freeform manner.

For each of the image pair a relative position for the foreground object is determined, S5. The relative position is defined as being relative to e.g. one or a plurality of predetermined "points" within the scene. However, it may of course be possible to make the position "absolute" by correlating one or a plurality of points within the scene to e.g. be a real GPS position, or similar.

For each extracted object within the scene a first probability as to the type of object is determined, S6. In a preferred embodiment of the invention a set of object types are predefined. Each of the set of the predefined object types are defined to have at least a length, a height and a width being within a predetermined range. The foreground object being extracted from the scene is accordingly matched to the set of predefined object types, and a probability is determined for the extracted foreground object as compared to the predefined object types. As understood, the set of predefined object types typically includes a set of height, width and length parameters defining the pedestrian, the bicycle, the car and the truck. The size (e.g. the boundary box as mentioned above) of the extracted foreground object is thus compared to the predefined parameters for each of the type of objects for determining the first probability.

A second probability is determined, S7, where the extracted foreground object essentially is "tracked" between subsequent image pairs of the image stream. In accordance to the invention a difference in the relative position is determined for the extracted foreground object, i.e. from one image pair to the next. Accordingly, it may be possible to, for each of the predefined object types, form a set of "speed" parameters/profile defining how fast the specific object type likely will move between subsequent image pairs. The tracking will generally also include determination of the direction of movement of the extracted object.

Finally, the type of the foreground object is determined, S8, by combining the first and the second probability, possibly with further information for increasing the probability of correctly determining the object type for the extracted foreground object.

Figure 4:
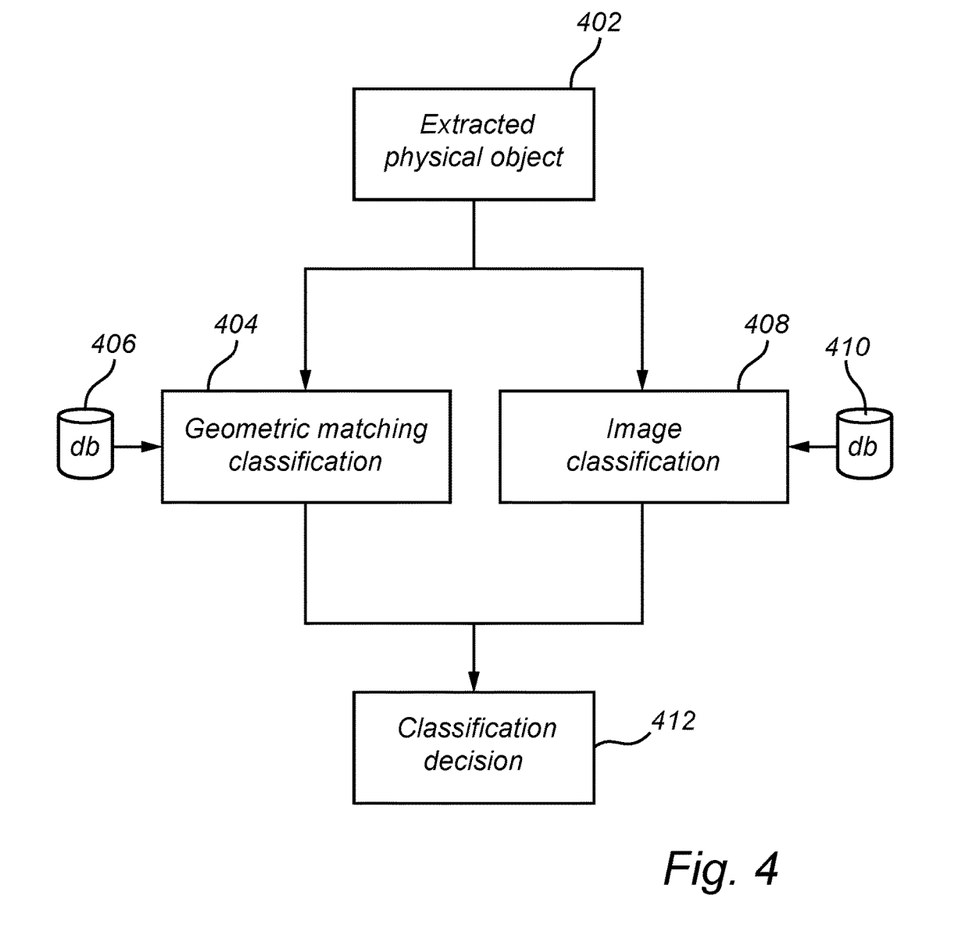
FIG. 4 depicts details of object classification according to the invention.

This is further exemplified in FIG. 4 showing details of the object classification method according to the invention. Specifically, the flowchart illustrates the above discussed geometric matching classification, e.g. including matching of size and "moving object positions" for subsequent image pairs with predefined object type parameters (i.e. 404 and 406). In addition, a further, e.g. possibly defined as a third probability may be determined by performing an image matching 408 between the extracted foreground object and representative image data stored in a database 410. The image matching may preferably take into account the direction of movement of the extracted object, for example for use in improving the selection of the "correct" image to match with, i.e. as the stored images to match with may be annotated to include information as to an aspect angle for the stored image. The third probability for the object type may typically be combined with the first and the second probability.

It should be understood that the combination of the first, second and third probability may be weighted, e.g. more weight could for example be given to the height, width and length parameter matching as compared to the remaining two probabilities. Any type of weighting may be possible and is within the scope of the invention. Also, it should be understood that the combined probability may be accumulated over time, i.e. by allowing further geometric matching classifications and/or image based classifications to be made for the same object. That is, it will likely be preferred to continue to track the object as long as the object is visible within the scene. Thereby, the likelihood of determining the correct object type will be increased.

Once the object type has been determined, i.e. being one of the predefined types of object, this knowledge may be used for a numerous different applications. For example, the image processing system 100 could be used in a traffic counting scenario comprising tracking mixed object types for categorizing the behavior for each of the object types. Similarly, the image processing system 100 according to the invention could be used for controlling traffic patterns, i.e. to control traffic lights in a city, for example by adapting time given for passing a street. For example, at peak hours with a high density of bicycles, the bicycles could be given more passing time as compared to cars, possibly improving the overall traffic environment within the city.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed invention, from a study of the drawings, the disclosure, and the appended claims. The person skilled in the art realizes that the present invention is not limited to the preferred embodiments.

The invention claimed is:

1. A computer-implemented method for classifying a type of a moving object within a scene, the moving object being one of a plurality of different types of predetermined objects, the method comprising:
   receiving an image stream comprising a plurality of images, each of the plurality of images being a captured representation of the scene and comprising depth information as to content within the scene, wherein the content of the scene comprises at least one physical foreground object and a physical background;
   processing the plurality of images to produce an equal plurality of depth maps of the scene;
   forming height maps for each of the plurality of images based on a predetermined model of the background and the corresponding depth map;
   extracting the at least one physical foreground object from each of the plurality of images based on the corresponding height map;
   determining, for each of the plurality of images, a relative position of the at least one physical foreground object within the scene based on the height maps;
   determining a first probability level for the type of object within each of the images by matching the extracted physical foreground object with a predetermined set of different object types, wherein each of the predetermined set of different object types are defined to have at least a length, a height and a width being within a predetermined range;
   determining a second probability level for the type of the object by determining a difference in the relative position for the object in at least two images of the plurality of images, converting the difference in relative position to a relative speed for the object, and matching the relative speed with speed profiles for the predetermined set of different object types; and
   defining the type of the foreground object based on a combination of the first and the second probability level.

2. The method according to claim 1, wherein the different types of predetermined objects comprise a pedestrian, a bicycle and a vehicle.

3. The method according to claim 1, further defining the type of foreground object based on a third probability level for the type of the object, wherein the third probability is determined by:
   matching the extracted foreground object with a set of predefined images for the plurality of different types of objects, and
   determining a probability level, being a representation for the third probability, based on a resulting matching level.

4. The method according to claim 3, wherein the determination of the third probability level is defined to be formed by an image based classifier.

5. The method according to claim 1, wherein the determination of the first and the second probability level is defined to be formed by a geometrical classifier.

6. The method according to claim 1, further comprising:
   determining a three dimensional boundary box surrounding the extracted foreground object.

7. The method according to claim 1, further comprising:
   tracking the extracted foreground object within subsequent images of the image stream.

8. The method according to claim 1, further comprising:
   storing, for each of the plurality of images, data representing the type of the extracted object and its relative position within a database.

9. The method according to claim 1, further comprising:
   controlling at least two cameras for acquiring the image stream, wherein each of the at least to cameras are arranged to capturing a predetermined spatially separated corresponding image of the scene, and
   determining the depth information based on the corresponding images captured by the at least two cameras.

10. The method according to claim 1, further comprising:
    determining an absolute position for the extracted foreground object based on an absolute position for at least one location within the scene.

11. An image processing system for classifying a type of a moving object within a scene, the moving object being one of a plurality of different types of predetermined objects, the image processing system comprising a control unit configured to:
    receiving an image stream comprising a plurality of images, each of the plurality of images being a captured representation of the scene and comprising depth information as to content within the scene, wherein the content of the scene comprises at least one physical foreground object and a physical background;
    processing the plurality of images to produce an equal plurality of depth maps of the scene;
    forming height maps for each of the plurality of images based on a predetermined model of the background and the corresponding depth map;
    extracting the at least one physical foreground object from each of the plurality of images based on the corresponding height map;
    determining, for each of the plurality of images, a relative position of the at least one physical foreground object within the scene based on the height maps;
    determining a first probability level for the type of object within each of the images by matching the extracted physical foreground object with a predetermined set of different object types, wherein each of the predetermined set of different object types are defined to have at least a length, a height and a width being within a predetermined range;
    determining a second probability level for the type of the object by determining a difference in the relative position for the object in at least two images of the plurality of images, converting the difference in relative position to a relative speed for the object, and matching the relative speed with speed profiles for the predetermined set of different object types; and defining the type of the foreground object based on a combination of the first and the second probability level.

12. The system according to claim 11, further comprising:
at least two cameras wherein each of the at least to cameras are arranged to capturing a predetermined spatially separated corresponding image of the scene, wherein the control unit is further configured to:
control at least two cameras for acquiring the image stream, and
determine the depth information based on the corresponding images captured by the at least two cameras.

13. The system according to claim 12, further comprising:
a position interface for receiving an absolute position for at least one location within the scene,
wherein the control unit is further configured to:
determine an absolute position for the extracted foreground object based on the absolute position.

14. The system according to claim 13, further comprising a GPS receiver connected to the position interface and providing the absolute position of the system.

15. A computer program product comprising a non-transitory computer readable medium having stored thereon computer program means for operating an image processing system comprising a control unit, the image processing system configured for classifying a type of a moving object within a scene, the moving object being one of a plurality of different types of predetermined objects, the computer program product comprising:
code for receiving an image stream comprising a plurality of images, each of the plurality of images being a captured representation of the scene and comprising depth information as to content within the scene, wherein the content of the scene comprises at least one physical foreground object and a physical background;
code for processing the plurality of images to produce an equal plurality of depth maps of the scene;
code for forming height maps for each of the plurality of images based on a predetermined model of the background and the corresponding depth map;
code for extracting the at least one physical foreground object from each of the plurality of images based on the corresponding height map;
code for determining, for each of the plurality of images, a relative position of the at least one physical foreground object within the scene based on the height maps;
code for determining a first probability level for the type of object within each of the images by matching the extracted physical foreground object with a predetermined set of different object types, wherein each of the predetermined set of different object types are defined to have at least a length, a height and a width being within a predetermined range;
code for determining a second probability level for the type of the object by determining a difference in the relative position for the object in at least two images of the plurality of images, converting the difference in relative position to a relative speed for the object, and matching the relative speed with speed profiles for the predetermined set of different object types; and
code for defining the type of the foreground object based on a combination of the first and the second probability level.

\* \* \* \* \*